United States Patent
Bense et al.

(10) Patent No.: US 9,364,939 B2
(45) Date of Patent: Jun. 14, 2016

(54) DEVICE FOR THE TEMPORARY POSITION FIXING OF AIRCRAFT STRUCTURES TO BE INTERCONNECTED

(71) Applicant: Airbus Operations GmbH, Hamburg (DE)

(72) Inventors: Rolf Bense, Jork (DE); Eugen Gorr, Hamburg (DE); Tim Strohbach, Ottersberg (DE)

(73) Assignee: Airbus Operations GmbH (DE)

( * ) Notice: Subject to any disclaimer, the term of this patent is extended or adjusted under 35 U.S.C. 154(b) by 276 days.

(21) Appl. No.: 14/011,104

(22) Filed: Aug. 27, 2013

(65) Prior Publication Data

US 2013/0341847 A1    Dec. 26, 2013

Related U.S. Application Data

(63) Continuation of application No. PCT/EP2012/053081, filed on Feb. 23, 2012.

(60) Provisional application No. 61/447,360, filed on Feb. 28, 2011.

(30) Foreign Application Priority Data

Feb. 28, 2011    (DE) .................. 10 2011 012 625

(51) Int. Cl.
*B25B 11/00*    (2006.01)
*B25B 5/12*    (2006.01)
*B64F 5/00*    (2006.01)

(52) U.S. Cl.
CPC .................. *B25B 11/007* (2013.01); *B25B 5/12* (2013.01); *B64F 5/0009* (2013.01)

(58) Field of Classification Search
CPC ............. B64F 5/009; B25B 5/12; B25B 5/06; B25B 5/006; B25B 11/007; B25B 11/005
USPC ...................................................... 269/21, 228
See application file for complete search history.

(56) References Cited

U.S. PATENT DOCUMENTS 4,681,520 A * 7/1987 Birkhauser, III ................ 425/12
5,728,258 A * 3/1998 Chung .................... B29C 73/32
                                                                  100/211

(Continued)

FOREIGN PATENT DOCUMENTS

CN    1617785 A    5/2005
CN    1976779 A    6/2007

(Continued)

OTHER PUBLICATIONS

Chinese Office Action Jan. 4, 2015.

(Continued)

*Primary Examiner* — Monica Carter
*Assistant Examiner* — Seahee Yoon
(74) *Attorney, Agent, or Firm* — Lerner, David, Littenberg, Krumholz & Mentlik, LLP

(57) ABSTRACT

A device for the temporary position fixing of adjacently arranged aircraft structures to be interconnected includes a support frame with at least one vacuum suction cup for temporary surface attachment and with clamping means for the position fixing of the aircraft structures to be interconnected. The support frame with the at least one vacuum suction cup in the region of a transverse gap is attached on the side of one aircraft structure. The support frame includes mechanical contact pressure means for the gap-bridging position fixing of the adjacent other aircraft structure. On the support frame there is a counter support to pressure elements of the contact pressure means.

12 Claims, 2 Drawing Sheets

(56) References Cited

U.S. PATENT DOCUMENTS

| | | | |
|---|---|---|---|
| 6,098,260 A | 8/2000 | Sarh | |
| 6,413,022 B1 * | 7/2002 | Sarh | B25B 11/005 408/16 |
| 6,467,385 B1 * | 10/2002 | Buttrick | B23D 45/003 29/897.2 |
| 6,843,328 B2 | 1/2005 | Boyl-Davis et al. | |
| 2001/0024603 A1 | 9/2001 | Stone et al. | |
| 2003/0221306 A1 | 12/2003 | Day et al. | |
| 2008/0181733 A1 | 7/2008 | Wright et al. | |
| 2010/0122444 A1 | 5/2010 | Reid et al. | |
| 2011/0265300 A1 | 11/2011 | Bense et al. | |

FOREIGN PATENT DOCUMENTS

| | | |
|---|---|---|
| DE | 10 2008 043 490 A1 | 5/2010 |
| DE | 10 2008 043 491 A1 | 5/2010 |
| EP | 1 884 453 A2 | 2/2008 |
| WO | 2006/002929 A1 | 1/2006 |
| WO | 2010052164 A2 | 5/2010 |

OTHER PUBLICATIONS

European Office Action dated Aug. 5, 2014.
German Office Action (Sep. 17, 2014).

* cited by examiner

US 9,364,939 B2

DEVICE FOR THE TEMPORARY POSITION FIXING OF AIRCRAFT STRUCTURES TO BE INTERCONNECTED

CROSS-REFERENCE TO RELATED APPLICATIONS

The present application is a continuation of International Application No. PCT/EP2012/053081, filed Feb. 23, 2012, which claims priority from German Patent Application No. 10 2011 012 625.2 filed Feb. 28, 2011 and claims the benefit of the filing date of U.S. Provisional Patent Application No. 61/447,360 filed Feb. 28, 2011, the disclosures of which are hereby incorporated herein by reference.

FIELD OF THE INVENTION

The present invention relates to a device for the temporary position fixing of adjacently arranged aircraft structures to be interconnected, with the device comprising a rigid support frame with at least one vacuum suction cup for the temporary surface attachment of the device to one of the adjacent aircraft structures, and with clamping means for the position fixing of the other aircraft structure to be connected by means of the aforesaid by way of a transverse gap.

The field of application of the invention predominantly relates to the manufacture of wide-body commercial aircraft or transport aircraft. They are mostly manufactured in shell construction, in particular in half-shell construction. In aircraft engineering the term "half-shell construction" refers to the construction of a fuselage section usually comprising two shells. When joined in line, several fuselage sections, for the rear region, the fuselage center, and the cockpit section, form the entire aircraft fuselage. On its inside the aircraft fuselage is reinforced by means of longitudinally extending stringers, and by means of frame elements that are arranged transversely to the aforesaid, with the outer skin comprising aluminum or some suitable synthetic material. Joining adjacent fuselage sections to form aircraft structures usually takes place with the use of a gap-bridging butt strap with an inside frame element. Screw-type fasteners and/or rivets are used as connecting elements. For inserting the connecting elements in the aircraft structures to be joined, as a rule, pilot holes are to be made.

BACKGROUND OF THE INVENTION

According to the generally known state of the art, adjacent fuselage sections to be interconnected are first correctly positioned relative to each other, and then the pilot holes for installation of the connecting elements are made. By means of special screw-type clipping rivets as connecting elements in a subsequent manufacturing step the connecting plates affixed to the fuselage sections are firmly tightened so that ingress of drilling chips between the components is prevented. However, since during pre-drilling for the purpose of inserting the screw-type clipping rivets no pre-stress force can be applied, after the pilot holes have been made the fuselage sections need to be separated and cleaned. Only after this is it possible to finally position the fuselage sections relative to each other, and to finally affix them by means of the special screw-type clipping rivets. In this process the components are drawn together by the screw-type clipping rivets to such an extent that ingress of drilling chips when drilling the remaining pilot holes is prevented. Renewed separation of the fuselage sections prior to final riveting, combined with the cleaning effort required for this step, overall results in quite considerable work effort and in long throughput times in the manufacture of fuselages.

From US 2003/0221306 A1 a device for the temporary position fixing of adjacent aircraft structures that are to be interconnected is known, which device comprises an integrated drilling device. Prior to drilling the pilot holes through a layer construction comprising an outer reinforcement strip, the outer skin of the aircraft itself, an inner reinforcement strip, and the inside frame element, clamping for the purpose of position fixing is carried out. To this effect the device has an outside device part that comprises an electrical coil and corresponds to an inside device part that comprises soft iron in order to ensure electromagnetic clamping. However, in this process the inside device part needs to be brought to correct alignment relative to the outside device part, which is not visible during installation, in order to ensure the clamping action of the electromagnetic field. Before a single pilot hole or a locally delimited region of pilot holes can be drilled after electromagnetic position fixing, the correct position of the device must be ensured. In order to drill further pilot holes, the entire device including the drilling device needs to be displaced and temporarily fixed anew. Operation of this combined device needs both electrical energy for the electromagnets and compressed air for the drilling device.

From DE 10 2008 043 491 A1 another device for the temporary position fixing of adjacent aircraft structures that are to be interconnected is known, which device also uses the electromagnetic clamping principle and in this respect comprises an outer device part and an inner device part; however, a drilling device does not form an integral part of this clamping device. With the use of the aforesaid quite a large work region can be fully positioned and fixed in position by means of one or several clamping devices, and subsequently the pilot holes can be drilled, which in this case are usually drilled with the use of a manual drilling tool. Nonetheless, as part of position fixing, care must be taken for correct opposing positioning of the outer device part and the inner device part, and for operation of the electromagnetically operating device the latter must be supplied with electrical current.

BRIEF SUMMARY OF THE INVENTION

An aspect of the present invention includes a device for the temporary position fixing of adjacent aircraft structures to be interconnected, which device makes do with few external energy supply lines while supporting easy and reliable positioning of the adjacent components.

The invention encompasses the technical teaching according to which the support frame with the at least one vacuum suction cup is attached on the side of an aircraft structure, and according to which the support frame comprises mechanical contact pressure means for the gap-bridging position fixing of the adjacent other aircraft structure over the transverse gap, wherein on the support frame there is a counter support to end-side pressure elements of the contact pressure means.

The solution according to an aspect of the invention is associated with an advantage, in particular, in that in a simple manner ingress of drill chippings between connecting plates of the fuselage sections during manufacture of the aircraft fuselage is prevented. This is because the device is affixed only to the outside of one aircraft structure and acts on the adjacent aircraft structure in order to establish aligned agreement, in the plane of the outer skin, of the adjacent aircraft structures. It is possible for the device to cover the entire circumference of a ring-shaped fuselage section as an aircraft structure in that several devices are used for working simultaneously. However, it is also possible for the device to be used only in some regions in order to manufacture connecting sections piece by piece. The connection can be carried out in just one single method-related step, because the otherwise usually applied moving apart and cleaning of the aircraft structures to be connected can be done without. This results in considerable savings in the manufacturing time.

The mechanical contact pressure means used in the context of the solution according to an aspect of the invention can be designed in various ways. In one embodiment it is proposed that the mechanical contact pressure means be designed as at least one toggle-joint clamp. By way of its free end the toggle-joint clamp installed on the support frame of the device pushes in a gap-bridging manner onto the surface of the adjacent aircraft structure in order to establish the desired correct positioning in the sense of a planar overall surface. In this process the toggle-joint clamp is manually operated by way of a handle in order to adjust the pressure element, which is arranged on the extremity of the free end, between the supported working position and a raised initial position.

As an alternative to the above it is also possible to design the mechanical contact pressure means as at least one pneumatic cylinder in the form of an actuator. This solution makes it possible to achieve a higher degree of automation because the pneumatic cylinders can be controlled by way of electro-pneumatic control valves in terms of their compressed air supply and venting. There is a further advantage in that the compressed air required for operating the pneumatic cylinder is present anyway at the device according to the invention if said device is also used to generate negative pressure for operating the at least one vacuum suction cup. To this effect the compressed air only needs to be supplied to a venturi nozzle, which is generally known for this purpose. The negative pressure generated on the side of the operating connection on the venturi nozzle is connected by way of a vacuum line to the at least one vacuum suction cup.

According to a measure of the invention, it is proposed that the counter support formed on the support frame comprise a compression spring. By way of the selection of the spring tension of the compression spring the clamping force for position fixing by the device can be set. To complement the above, it is also imaginable to provide a compression spring with a regulating screw in order to vary the spring preload.

Preferably, the support frame is designed so as to be plate-shaped. In this way on the underside the at least one vacuum suction cup can be arranged, while the top provides space for attachment of the contact pressure means on the support frame.

In a preferred embodiment the plate-shaped support frame is of an approximately triangular design, i.e. it comprises three preferably rounded ends that are interconnected by way of straight or curved sides. In this configuration, advantageously, on the end of the support frame, which end is located away from the transverse gap, the counter support should be arranged, and the two remaining ends of the support frame, which ends are located near the transverse gap, comprise at least one vacuum suction cup each.

In order to maximize the clamping force that can be produced by the device according to the invention, it makes sense to arrange several vacuum suction cups side by side in a row on the support frame in the direction of extension of the transverse gap. Thus in the case of a triangular support frame, vacuum suction cups extend in a row between the two ends located near the transverse gap.

According to a particular embodiment of the invention, which embodiment is in particular suited in conjunction with ring-shaped fuselage sections as aircraft structures, it is proposed that the support frame for embracing this aircraft structure be of a ring-shape design, in other words form a type of belt, wherein on the inside vacuum suction cups are arranged for affixation to one of the adjacent aircraft structures, and on the outside the contact pressure means are arranged, which are preferably spaced apart from each other equidistantly around the entire circumference of the belt-like support frame. Such a support frame can, for example, be designed as a flexible metal strip, for example a steel belt. It is also imaginable that only some regions of the circumference are equipped with corresponding sectional support frames.

According to another measure of the invention, it is proposed that the pressure elements that make contact with the other aircraft structure, which pressure elements according to the preferred embodiments are arranged either on the free end of the toggle-joint clamp or on the distal end of the piston rod of the pneumatic cylinder, comprise a sliding foot to protect the surface. Such a sliding foot can, for example, comprise a plastic or a Teflon material in order to effectively protect the sensitive outside surface of the aircraft structure from damage. Since the at least one vacuum suction cup, arranged on the side of the adjacent aircraft structure, per se for reasons of air tightness is made from an elastomer material, no additional surface protection is required for this.

BRIEF DESCRIPTION OF THE DRAWINGS

Further measures of the invention are shown in more detail below, together with a description of preferred exemplary embodiments of the invention with reference to the figures. The following are shown.

DETAILED DESCRIPTION

Figure 1:
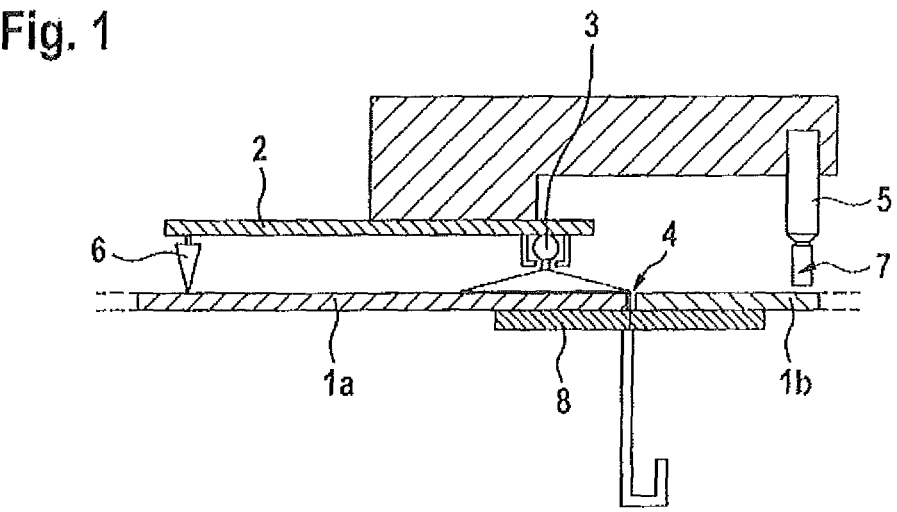
FIG. 1 a diagrammatic cross-sectional view of a device for the temporary position fixing of adjacent aircraft structures to be interconnected, FIG. 2 a diagrammatic front view of another embodiment of a device for the temporary position fixing of adjacent aircraft structures to be interconnected, FIG. 3 a perspective view of a first embodiment of the device according to FIG. 1, and FIG. 4 a diagrammatic-perspective view of a second embodiment of the device according to FIG. 2.

According to FIG. 1, the device for the temporary position fixing of adjacently arranged aircraft structures 1a and 1b to be interconnected comprises a support frame 2 with at least one vacuum suction cup 3 affixed in the region of a transverse gap 4 on the side of one aircraft structure 1a. At least in its edge region the aircraft structure 1a is designed so as to be considerably more rigid than the other aircraft structure 1b, which by means of the device as a result of easy deformation can be made to conform to the aircraft structure 1a.

Mechanical contact pressure means, in the present embodiment a pneumatic cylinder 5 (shown diagrammatically), are attached in a gap-bridging manner to the support frame 2 in such a manner that clamping pressure is exerted approximately perpendicularly onto the adjacent aircraft structure 1b. In order to absorb the clamping force on the side of the support frame 2, the latter comprises a counter support 6 at the end. The end of the piston rod of the pneumatic cylinder 5 comprises a pressure element 7 so that the clamping force in the extended state of the pneumatic cylinder 5 is applied by the counter support 6 and the pressure element 7 to the adjacent aircraft structures 1a and 1b respectively. On the inside of the aircraft structure a frame element 8 is arranged so as to bridge the transverse gap 4 in order to provide the aircraft structure in its installed state with the required stability. Connecting means for attaching the components after position fixing are not shown in the figures.

Figure 2:
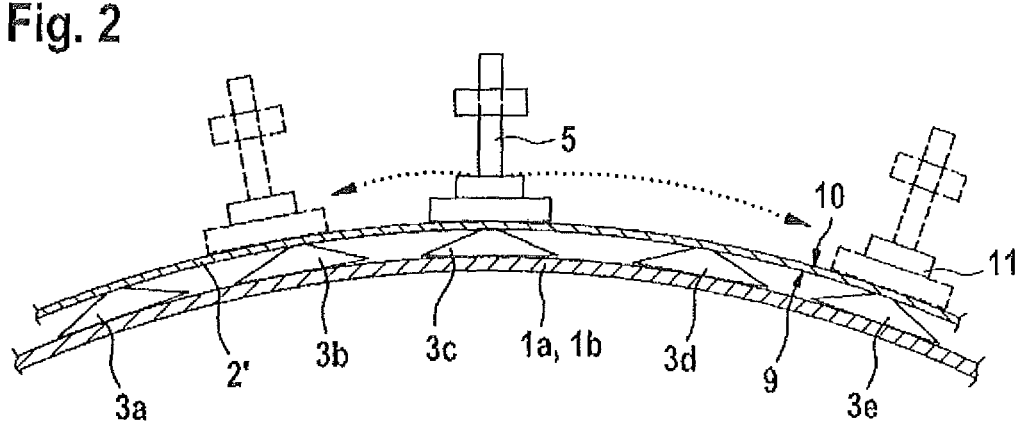

According to FIG. 2, a belt-like support frame 2' embraces (in this illustration only partially) the ring-shaped aircraft structure 1a and 1b. On the inside 9 of the belt-shaped support frame 2' vacuum suction cups 3a to 3e are affixed so as to be spaced apart equidistantly. The opposing outside 10 of the support frame 2' is used to attach the contact pressure means, which here again comprise a pneumatic cylinder 5 (shown diagrammatically).

The support frame 2' is designed as a metal strip, and the pneumatic cylinder 5 is installed on a slide 11 by means of which the aforesaid can be positioned along the ring-shaped support frame 2' (dotted line). Through this the clamping force could be locally generated in the location where it is needed for assembly.

Figure 3:
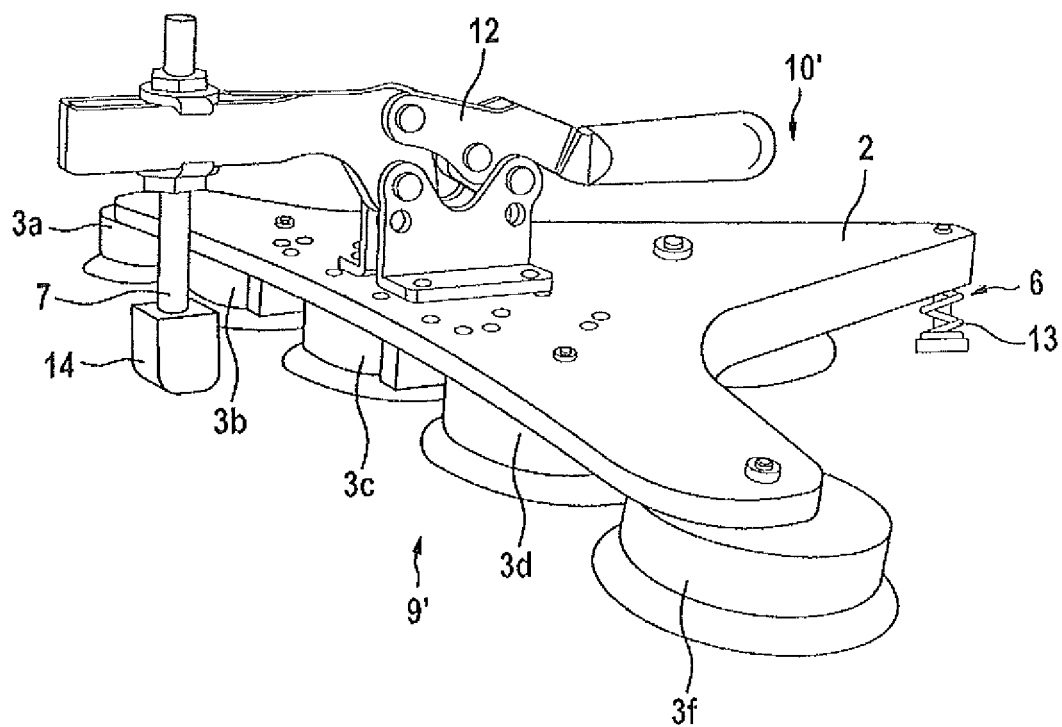

According to FIG. 3, in contrast to the previously described exemplary embodiment, the support frame 2 is of a plate-shaped design and on its underside 9' comprises a number of vacuum suction cups 3a to 3f. In the assembly position they are placed longitudinally beside the transverse gap (not shown in the diagram) between the aircraft structures to be interconnected. At the top 10' the contact pressure means, in the present embodiment in the form of a toggle-joint clamp 12, are attached. In this exemplary embodiment the counter support 6 on the plate-shaped support frame 2 comprises a compression spring 13, by means of which the clamping force of position fixing can be defined.

The compression spring 13 interacts with the pressure element 7, which in the present embodiment is bar-shaped in design, is transversely adjustable, and is attached to a cantilever of the toggle-joint clamp 12 by way of a screw-type connection. At the distal end of the pressure element 7 a sliding foot 14 is arranged that is used to protect the surface of the contacting outside (not shown) of the structure.

Figure 4:
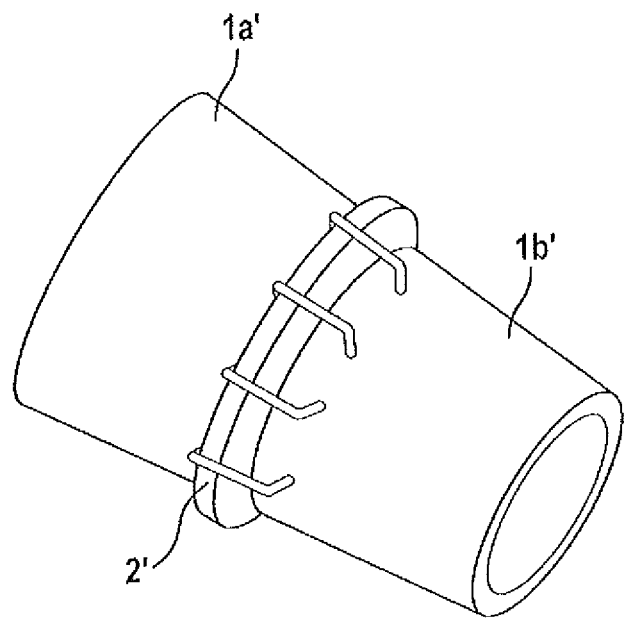

FIG. 4 diagrammatically shows a ring-shaped support frame 2' that embraces two aircraft structures 1a' and 1b' that are designed as ring-shaped fuselage sections and that are to be interconnected. The ring-shaped support frame 2' carries several contact pressure means, spaced apart from each other, which contact pressure means can be designed as pneumatic cylinders, toggle-joint clamps or the like.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Aircraft structure
2 Aircraft support frame
3 Vacuum suction cup
4 Transverse gap
5 Pneumatic cylinder
6 Counter support
7 Pressure element
8 Frame element
9 Underside
10 Top
11 Slide
12 Toggle-joint clamp
13 Compression spring
14 Sliding foot

The invention claimed is:

1. An assembly comprising:
first and second adjacently arranged aircraft structures to be interconnected; and
a device for a temporary position fixing of the first and second adjacently arranged aircraft structures, the device comprising:
a support frame having:
at least one vacuum suction cup for temporary surface attachment;
mechanical contact pressure means having a pressure element; and
a counter support means to counter the pressure element of the mechanical contact pressure means,
wherein the first and second aircraft structures are arranged adjacently in a plane of an outer skin thereby forming a transverse gap therebetween,
wherein the support frame with the at least one vacuum suction cup is attachable on the side of the first aircraft structure in the region of the transverse gap, and
wherein the mechanical contact pressure means is configured for fixing of the adjacent second aircraft structure arranged on the other side of the transverse gap to establish an aligned agreement.

2. The assembly of claim 1, wherein the mechanical contact pressure means comprise at least one toggle-joint clamp as an actuator.

3. The assembly of claim 1, wherein the mechanical contact pressure means comprise at least one pneumatic cylinder as an actuator.

4. The assembly of claim 3, wherein the compressed air required for feeding the pneumatic cylinders also serves to generate negative pressure for operating the at least one vacuum suction cup.

5. The assembly of claim 1, wherein the counter support formed on the support frame comprises a compression spring to, by way of the spring tension of the compression spring, adjust the clamping force for position fixing.

6. The assembly of claim 1, wherein the support frame is configured so as to be plate-shaped, wherein on an underside thereof the at least one vacuum suction cup is arranged, and at a top thereof, the contact pressure means are arranged.

7. The assembly of claim 6, wherein the plate-shaped support frame is configured so as to be triangular, wherein an end of the support frame, located away from the transverse gap, comprises the counter support, and the two remaining ends of the support frame located near the transverse gap, are associated at least with one vacuum suction cup each.

8. The assembly of claim 1, wherein the support frame for embracing the aircraft structure is of a ring-shaped design, wherein on the inside of said support frame the at least one vacuum suction cup is arranged, and on the outside of said support frame the contact pressure means are arranged.

9. The assembly of claim 8, wherein the ring-shaped support frame is configured as a metal hoop.

10. The assembly of claim 1, further comprises a plurality of the vacuum suction cups arranged side by side in a row on the support frame in the direction of extension of the transverse gap.

11. The assembly of claim 1, wherein the pressure element comprises a sliding foot to protect the surface.

12. The assembly of claim 1, wherein the first and second aircraft structures to be interconnected comprise first and second adjacent ring-shaped fuselage sections.

* * * * *